US011877530B2

(12) United States Patent
Barry et al.

(10) Patent No.: US 11,877,530 B2
(45) Date of Patent: Jan. 23, 2024

(54) AGRICULTURAL VACUUM AND ELECTRICAL GENERATOR DEVICES, SYSTEMS, AND METHODS

(71) Applicant: Ag Leader Technology, Ames, IA (US)

(72) Inventors: Alan F. Barry, Nevada, IA (US); Jeff Westbrook, Ames, IA (US); Kirk Stevens, Ames, IA (US); Vahid Ellig, Roland, IA (US); Steven Brown, Ames, IA (US)

(73) Assignee: Ag Leader Technology, Ames, IA (US)

( * ) Notice: Subject to any disclaimer, the term of this patent is extended or adjusted under 35 U.S.C. 154(b) by 286 days.

(21) Appl. No.: 17/060,844

(22) Filed: Oct. 1, 2020

(65) Prior Publication Data

US 2021/0092896 A1 Apr. 1, 2021

Related U.S. Application Data

(60) Provisional application No. 62/908,825, filed on Oct. 1, 2019.

(51) Int. Cl.
 *F04D 25/04* (2006.01)
 *A01C 19/02* (2006.01)
 (Continued)

(52) U.S. Cl.
 CPC ............. *A01C 19/02* (2013.01); *A01C 7/081* (2013.01); *F04D 25/04* (2013.01); *F04D 27/004* (2013.01)

(58) Field of Classification Search
 CPC ......... A01C 15/04; A01C 19/02; A01C 7/081; F04D 17/16; F04D 25/04; F04D 27/004;
 (Continued)

(56) References Cited

U.S. PATENT DOCUMENTS 9,439 A 12/1852 Colver
140,493 A 7/1873 Fulghum et al.
(Continued)

FOREIGN PATENT DOCUMENTS

BR 102015003633 2/2021
BR 102016002919 2/2021
(Continued)

OTHER PUBLICATIONS

Ag Leader Technology, "Ag Leader SureSpeed", Feb. 17, 2020, Publisher: YouTube.
(Continued)

*Primary Examiner* — Sabbir Hasan
*Assistant Examiner* — Joshua R Beebe
(74) *Attorney, Agent, or Firm* — Dentons Davis Brown PC; Matthew Warner-Blankenship

(57) ABSTRACT

The disclosure relates to devices, systems, and corresponding methods to be used in connection with agricultural planters. More particularly to a vacuum and generator system including a housing, a fan assembly within the housing, a generator, and a hydraulic motor. Some implementations include a voltage regulator or voltage regulation module. The system allow for adjustable fan control without affecting electrical output, integral cooling, and multi-level voltage output from a single generator. Additionally, the system provides greater efficiency in operating an agricultural implement.

19 Claims, 10 Drawing Sheets

(51) Int. Cl.
*F04D 27/00* (2006.01)
*A01C 7/08* (2006.01)

(58) Field of Classification Search
CPC ............... F04D 29/4213; F04D 29/424; F04D 29/5813; F04D 29/582; F05D 2220/76; Y02B 30/70
See application file for complete search history.

(56) References Cited

U.S. PATENT DOCUMENTS

| | | | |
|---|---|---|---|
| 658,348 A | 9/1900 | Crowley | |
| 1,220,684 A | 3/1917 | Ray | |
| 1,264,454 A | 4/1918 | Terrell | |
| 1,376,933 A | 5/1921 | Gould, Jr. | |
| 1,397,689 A | 11/1921 | Krotz | |
| 1,566,187 A | 12/1925 | Fifer | |
| 1,997,791 A | 4/1935 | Hoberg et al. | |
| 2,053,390 A | 9/1936 | Bateman et al. | |
| 2,054,552 A | 9/1936 | Wakeham | |
| 2,141,044 A | 12/1938 | Rassmann | |
| 2,340,163 A | 1/1944 | White | |
| 2,440,846 A | 5/1948 | Cannon | |
| 2,510,658 A | 6/1950 | Rassmann | |
| 2,566,406 A | 9/1951 | Dougherty | |
| 2,589,762 A | 3/1952 | Barnett et al. | |
| 2,673,536 A | 3/1954 | Skinner | |
| 2,975,936 A | 3/1961 | Rousek | |
| 2,980,043 A | 4/1961 | Beck | |
| 3,077,290 A | 2/1963 | Rehder | |
| 3,122,283 A | 2/1964 | Walters | |
| 3,176,636 A | 4/1965 | Wilcox et al. | |
| 3,253,739 A | 5/1966 | Martin | |
| 3,272,159 A | 9/1966 | Sanderson | |
| 3,325,060 A | 6/1967 | Rehder | |
| 3,343,507 A | 9/1967 | Smith | |
| 3,413,941 A | 12/1968 | Roberson | |
| 3,511,411 A * | 5/1970 | Weiss ................ | A01M 7/0089 222/614 |
| 3,693,833 A | 9/1972 | Weitz | |
| 3,913,503 A | 10/1975 | Becker | |
| 3,990,606 A | 11/1976 | Gugenhan | |
| 4,002,266 A | 1/1977 | Beebe | |
| 4,023,509 A | 5/1977 | Hanson | |
| 4,026,437 A | 5/1977 | Biddle | |
| 4,029,235 A | 6/1977 | Grataloup | |
| 4,037,755 A | 7/1977 | Reuter | |
| 4,193,523 A | 3/1980 | Koning | |
| 4,282,985 A | 8/1981 | Yamamoto | |
| 4,324,347 A | 4/1982 | Thomas | |
| 4,333,561 A | 6/1982 | Schlegel | |
| 4,343,414 A * | 8/1982 | Lark .................... | A01C 7/102 222/614 |
| 4,449,642 A | 5/1984 | Dooley | |
| 4,600,122 A | 7/1986 | Lundie et al. | |
| 4,653,410 A | 3/1987 | Typpi | |
| 4,793,511 A | 12/1988 | Ankum et al. | |
| 4,949,869 A | 8/1990 | Ribouleau | |
| 5,170,909 A | 12/1992 | Lundie et al. | |
| 5,271,470 A * | 12/1993 | King .................... | A01M 17/00 47/DIG. 12 |
| 5,404,580 A | 4/1995 | Simpson et al. | |
| 5,501,366 A | 3/1996 | Fiorido | |
| 5,601,209 A | 2/1997 | Barsi et al. | |
| 5,664,507 A | 9/1997 | Bergland et al. | |
| 5,697,308 A | 12/1997 | Rowlett | |
| 5,720,233 A | 2/1998 | Lodico | |
| 5,765,720 A | 6/1998 | Stufflebeam | |
| 5,799,598 A | 9/1998 | Stufflebeam | |
| 5,848,571 A | 12/1998 | Stufflebeam | |
| 5,975,283 A | 11/1999 | Riffe | |
| 6,003,455 A * | 12/1999 | Flamme ............... | A01C 23/007 111/915 |
| 6,142,086 A | 11/2000 | Richard | |
| 6,260,632 B1 | 7/2001 | Bourgault et al. | |
| 6,269,758 B1 | 8/2001 | Sauder | |
| 6,293,438 B1 | 9/2001 | Woodruff | |
| 6,352,042 B1 | 3/2002 | Martin | |
| 6,516,733 B1 | 2/2003 | Sauder | |
| 6,640,731 B1 | 11/2003 | Rowlett | |
| 6,651,570 B1 | 11/2003 | Thiemke | |
| 6,681,706 B1 | 1/2004 | Sauder | |
| 6,718,892 B1 | 4/2004 | Rosenboom | |
| 6,748,885 B2 | 6/2004 | Sauder | |
| 6,752,095 B1 | 6/2004 | Rylander et al. | |
| 7,131,384 B2 | 11/2006 | Kester | |
| 7,170,480 B2 | 1/2007 | Boldt, Jr. et al. | |
| 7,263,937 B2 | 9/2007 | Frasier | |
| 7,334,532 B2 | 2/2008 | Sauder et al. | |
| 7,404,366 B2 | 7/2008 | Mariman | |
| 7,448,334 B2 | 11/2008 | Mariman | |
| 7,490,565 B2 | 2/2009 | Holly | |
| 7,581,684 B2 | 9/2009 | des Garennes et al. | |
| 7,584,707 B2 | 9/2009 | Sauder et al. | |
| 7,661,377 B2 | 2/2010 | Keaton | |
| 7,854,206 B2 | 12/2010 | Maschinen | |
| 7,918,168 B2 | 4/2011 | Garner et al. | |
| 8,074,586 B2 | 12/2011 | Garner et al. | |
| 8,276,529 B2 | 10/2012 | Garner et al. | |
| 8,322,293 B2 | 12/2012 | Wollenhaupt et al. | |
| 8,336,471 B2 | 12/2012 | Gilstring | |
| 8,375,873 B2 | 2/2013 | Nelson et al. | |
| 8,375,874 B2 | 2/2013 | Peterson | |
| 8,443,742 B2 | 5/2013 | Orrenius | |
| 8,448,585 B2 | 5/2013 | Wilhelmi et al. | |
| 8,468,960 B2 | 6/2013 | Garner et al. | |
| 8,522,699 B2 | 9/2013 | Garner et al. | |
| 8,671,856 B2 | 3/2014 | Garner et al. | |
| 8,677,914 B2 | 3/2014 | Stark | |
| 8,746,159 B2 | 6/2014 | Garner et al. | |
| 8,789,482 B2 | 7/2014 | Garner et al. | |
| 8,789,483 B2 | 7/2014 | Gilstring | |
| 8,800,457 B2 | 8/2014 | Garner et al. | |
| 8,813,663 B2 | 8/2014 | Garner et al. | |
| 8,850,995 B2 | 10/2014 | Garner | |
| 8,850,998 B2 | 10/2014 | Garner et al. | |
| 8,939,733 B2 * | 1/2015 | Mann .................... | F04D 25/04 416/200 R |
| 8,942,896 B2 | 1/2015 | Mayerle | |
| 8,978,564 B2 | 3/2015 | Hagny | |
| 8,985,037 B2 | 3/2015 | Radtke | |
| 9,137,941 B2 | 9/2015 | Stark | |
| 9,148,992 B2 | 10/2015 | Staeter | |
| 9,151,388 B2 | 10/2015 | Gilstring | |
| 9,265,191 B2 | 2/2016 | Sauder | |
| 9,277,688 B2 | 3/2016 | Wilhelmi | |
| 9,282,691 B2 | 3/2016 | Wilhelmi | |
| 9,282,692 B2 | 3/2016 | Wilhelmi | |
| 9,313,941 B2 | 4/2016 | Garner et al. | |
| 9,313,942 B2 | 4/2016 | Wilhelmi | |
| 9,332,689 B2 | 5/2016 | Baurer et al. | |
| 9,345,188 B2 | 5/2016 | Garner et al. | |
| 9,351,440 B2 | 5/2016 | Sauder | |
| 9,426,940 B2 | 8/2016 | Connors et al. | |
| 9,433,141 B2 | 9/2016 | Friestad et al. | |
| 9,480,199 B2 | 11/2016 | Garner et al. | |
| 9,491,901 B2 | 11/2016 | Gentili | |
| 9,510,502 B2 | 12/2016 | Garner et al. | |
| 9,578,802 B2 | 2/2017 | Radtke | |
| 9,603,298 B2 | 3/2017 | Wendte et al. | |
| 9,622,402 B2 | 4/2017 | Kinzenbaw et al. | |
| 9,629,301 B2 | 4/2017 | Gentili | |
| 9,629,302 B2 | 4/2017 | Gentili | |
| 9,661,799 B2 | 5/2017 | Garner et al. | |
| 9,675,002 B2 | 6/2017 | Roszman | |
| 9,686,906 B2 | 6/2017 | Garner et al. | |
| 9,693,498 B2 | 7/2017 | Zumdome | |
| 9,699,955 B2 | 7/2017 | Garner et al. | |
| 9,706,702 B2 | 7/2017 | Wendte et al. | |
| 9,733,634 B2 | 8/2017 | Prickel | |
| 9,769,978 B2 | 9/2017 | Radtke | |
| 9,756,779 B2 | 11/2017 | Wilhelmi et al. | |
| 9,807,921 B2 | 11/2017 | Levy et al. | |
| 9,807,922 B2 | 11/2017 | Garner et al. | |

(56) References Cited

U.S. PATENT DOCUMENTS

| | | | |
|---|---|---|---|
| 9,807,924 B2 | 11/2017 | Garner et al. | |
| 9,814,176 B2 | 11/2017 | Kowalchuk | |
| 9,820,427 B2 | 11/2017 | Hagny | |
| 9,820,429 B2 | 11/2017 | Garner et al. | |
| 9,861,025 B2 | 1/2018 | Schaefer et al. | |
| 9,861,031 B2 | 1/2018 | Garner et al. | |
| 9,872,424 B2 | 1/2018 | Baurer et al. | |
| 9,936,627 B2 | 4/2018 | Wilhelmi et al. | |
| 9,936,628 B2 | 4/2018 | Wilhelmi et al. | |
| 9,949,426 B2 | 4/2018 | Radtke | |
| 9,980,426 B2 | 5/2018 | Wilhelmi et al. | |
| 10,004,173 B2 | 6/2018 | Garner et al. | |
| 10,010,024 B2 | 7/2018 | Pirkenseer et al. | |
| 10,051,782 B2 | 8/2018 | Wilhelmi et al. | |
| 10,104,832 B2 | 10/2018 | Wilhelmi et al. | |
| 10,125,777 B2 * | 11/2018 | Thompson | A01C 7/081 |
| 10,154,623 B2 | 12/2018 | Wilhelmi et al. | |
| 10,206,326 B2 | 2/2019 | Garner et al. | |
| 10,299,425 B2 | 5/2019 | Sauder et al. | |
| 10,398,077 B2 | 9/2019 | Radtke | |
| 10,470,358 B2 | 11/2019 | Sauder et al. | |
| 10,485,159 B2 | 11/2019 | Wilhelmi et al. | |
| 10,729,063 B2 | 8/2020 | Garner et al. | |
| 10,806,070 B2 | 10/2020 | Garner et al. | |
| 11,058,048 B2 | 7/2021 | Radtke | |
| 2010/0224110 A1 | 9/2010 | Mariman | |
| 2015/0289441 A1 * | 10/2015 | Arnett | A01C 19/02 111/185 |
| 2015/0305229 A1 | 10/2015 | Sauder | |
| 2017/0124604 A1 * | 5/2017 | Hill | G06Q 50/01 |
| 2018/0271015 A1 * | 9/2018 | Redden | G06N 3/006 |

FOREIGN PATENT DOCUMENTS

| | | | |
|---|---|---|---|
| CA | 1218266 | | 2/1987 |
| CA | 2213350 | A1 | 7/2002 |
| CA | 2213354 | | 7/2002 |
| CA | 2213703 | | 7/2002 |
| CA | 2213703 | A1 | 7/2002 |
| CA | 2213350 | | 9/2002 |
| CA | 2923713 | | 12/2016 |
| CA | 2830627 | | 5/2019 |
| CA | 2915844 | | 4/2020 |
| DE | 389840 | | 2/1924 |
| DE | 2011462 | | 9/1971 |
| DE | 2826658 | | 4/1981 |
| DE | 8400142 | | 5/1984 |
| DE | 3405031 | | 4/1985 |
| EP | 0047577 | A2 | 3/1982 |
| EP | 0152048 | | 5/1986 |
| EP | 0182220 | | 4/1990 |
| EP | 0606541 | | 1/1997 |
| EP | 2688384 | | 1/2014 |
| EP | 2911497 | | 2/2015 |
| EP | 2911499 | | 2/2015 |
| EP | 1461989 | | 5/2015 |
| EP | 3108731 | | 12/2016 |
| EP | 3262911 | A2 * | 1/2018 ........... A01B 63/145 |
| FR | 1503687 | | 12/1967 |
| FR | 2414288 | | 8/1979 |
| FR | 2591061 | | 6/1986 |
| FR | 2574243 | | 6/1987 |
| GB | 18381 | | 10/1904 |
| GB | 482789 | | 4/1937 |
| GB | 989145 | | 4/1965 |
| GB | 2012534 | | 8/1979 |
| GB | 2057835 | | 4/1981 |
| JP | 562481 | | 3/1981 |
| JP | H1159886 | | 3/1999 |
| JP | 2007117941 | | 5/2007 |
| NL | 1005451 | | 9/1998 |
| SU | 948316 | | 8/1982 |
| WO | 9849884 | | 11/1998 |
| WO | 2005011358 | | 2/2005 |
| WO | WO-2009021625 | A1 * | 2/2009 ........... A01C 17/005 |
| WO | 2010059101 | | 5/2010 |
| WO | 2010124360 | | 11/2010 |
| WO | 2013130003 | | 9/2013 |

OTHER PUBLICATIONS

Ag Leader Technology, "Ag Leader SureSpeed Unveiling", Feb. 12, 2020, Publisher: Youtube.

Kinze Manufacturing, "True Speed—3D with Ultra Slow Motion", Feb. 24, 2020, Publisher: YouTube.

"High Speed Planting Solution True Speed", 2020, Publisher: Kinze.

Kinzemanufacturing, "An In-Depth Look into Kinze's True Speed", Feb. 26, 2020, Publisher: YouTube.

Tempo, 2017, Publisher: Vaderstad.

* cited by examiner

AGRICULTURAL VACUUM AND ELECTRICAL GENERATOR DEVICES, SYSTEMS, AND METHODS

CROSS-REFERENCE TO RELATED APPLICATION(S)

This application claims priority to U.S. Provisional Application No. 62/908,825 filed Oct. 1, 2019 and entitled "Agricultural Vacuum and Electrical Generator Devices, Systems, And Methods," which is hereby incorporated by reference in its entirety under 35 U.S.C. § 119(e).

TECHNICAL FIELD

The disclosure relates to devices, systems, and corresponding methods to be used in connection with agricultural planters.

BACKGROUND

The disclosure relates to devices, systems, and methods to be used on and in conjunction with an agricultural implement or other equipment, such as a planter. Various planting systems utilize a variety of energy sources and systems to power and operate the implement. For example, some known planters use a positive pressure system to move seeds from a seed hopper to a seed meter and a negative pressure/vacuum system to deposit seeds in soil from the seed meter.

Additionally, planters frequently utilize generators and/or alternators to power the electronics of the planter. Often, the hydraulic system of the tractor is the ultimate source of power for each system and/or device. But each system and/or device may have different requirements of the hydraulic system and therefore cause inefficiencies in the overall operation of the implement which may cause waste in the form of heat.

There is a need in the art for devices, systems, and methods for improving the efficiency of various systems on an agricultural implement, particularly the hydraulic, electric, and air pressure systems.

BRIEF SUMMARY

Disclosed herein are various air pressure and generator devices and systems for use in connection with an agricultural implement.

In Example 1, a system comprising a housing comprising a fan housing comprising a first side and a second side, a fan assembly disposed within the fan housing, a generator connected to the first side of the fan housing, a hydraulic motor connected to the second side of the fan housing, wherein air passes over the generator from the fan to provide integral cooling and the fan and the generator are driven by a common shaft from the hydraulic motor.

In Example 2, the system of claim 1, wherein the generator provides multi-level voltage output.

In Example 3, the system of claim 1, further comprising a voltage regulator in communication with the generator.

In Example 4, the system of claim 1, where in the fan assembly speed is adjustable.

In Example 5, the system of claim 1, further comprising a controller constructed and arranged to modulate speed of the hydraulic motor, speed of the fan assembly, or generator output.

In Example 6, the system of claim 1, further comprising one or more air duct in fluidic communication with the fan assembly.

In Example 7, the system of claim 6, wherein the one or more air ducts are in communication with one or more seed meters.

In Example 8, an air pressure and electrical generator comprising a hydraulic motor comprising a hydraulic motor shaft, a fan assembly in operative communication with the hydraulic motor shaft, an electrical generator in operative communication with the hydraulic motor shaft, wherein actuations of the hydraulic motor shaft causes actuation of both the fan assembly and the electrical generator.

In Example 9, the generator of claim 8, further comprising a connecting shaft extending from the hydraulic motor to the fan assembly and the electrical generator, wherein the connecting shaft is configured to rotate the fan assembly and the electrical generator.

In Example 10, the generator of claim 8, further comprising a voltage regulator in operative communication with the electrical generator, the voltage regulator constructed and arranged to generate consistent output voltage from variable input voltage.

In Example 11, the generator of claim 8, wherein the fan assembly is configured to generate positive air pressure.

In Example 12, the generator of claim 8, wherein the fan assembly is configured to generate negative air pressure.

In Example 13, the generator of claim 8, wherein the speed of the fan assembly is adjustable by varying the speed of the hydraulic motor.

In Example 14, the generator of claim 8, further comprising a controller constructed and arranged to command output of the electrical generator or a voltage regulator in communication with the electrical generator.

In Example 15, an agricultural planter system comprising a plurality of row units, a remote hydraulic system, one or more air pressure and electrical generators comprising a motor, in fluidic communication with the remote hydraulic system, a fan in operative communication with the motor, wherein the fan is constructed and arranged to generate positive or negative air pressure, and a generator in operative communication with the motor and the fan, the generator constructed and arranged to generate electrical power, wherein the motor, fan, and generator rotate about a common axis, one or more seed meters in operative communication with the air pressure and electrical generators.

In Example 16, the system of claim 15, further comprising a voltage regulator in electrical communication with the generator.

In Example 17, the system of claim 16, wherein the voltage regulator is constructed and arranged to output power via more than one output channels.

In Example 18, the system of claim 17, wherein the output channels may have varied voltages.

In Example 19, the system of claim 16, further comprising a controller in operative communication with the voltage regulator, wherein the controller is constructed and arranged to command output of the voltage regulator.

In Example 20, the system of claim 15, wherein the generator is constructed and arranged to produce between about 12 and 80 volts.

While multiple embodiments are disclosed, still other embodiments of the disclosed devices, systems and methods will become apparent to those skilled in the art from the following detailed description, which shows and describes illustrative embodiments of the various implementations. As will be realized, the disclosed devices, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1:
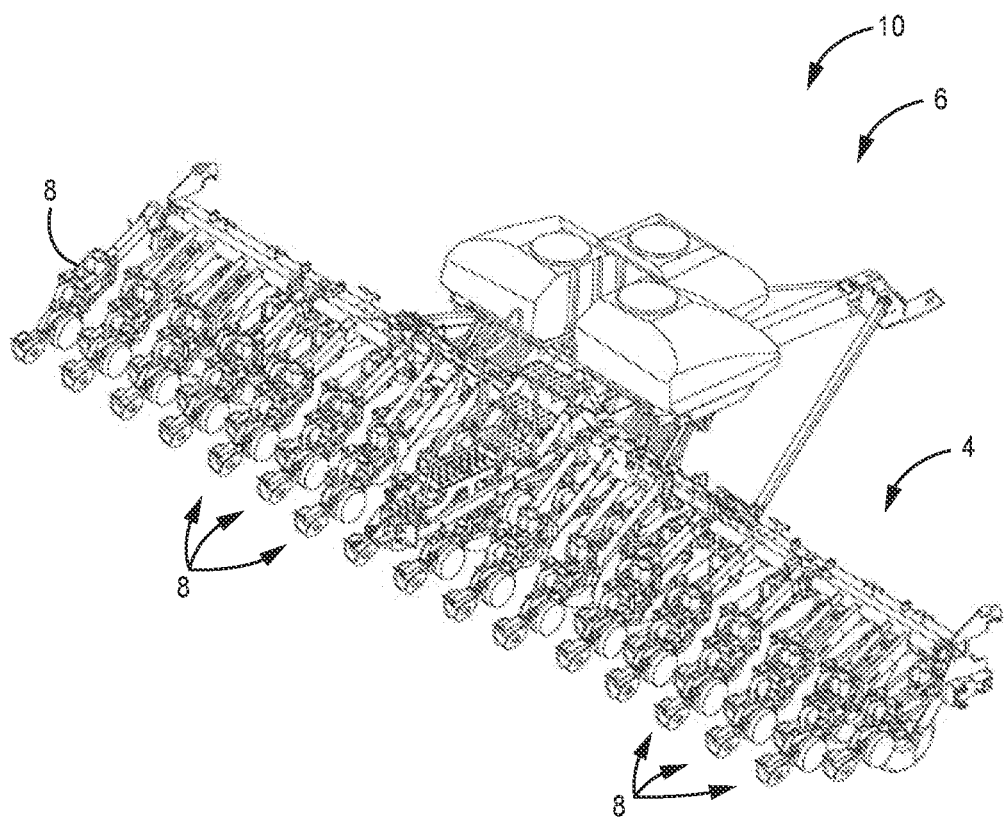
FIG. 1 is an overview of a tool bar comprising a plurality of row units for use with various implementations of the system.

The various implementations disclosed herein relate to an efficient fan and generator and associated systems, methods, and devices for use in agricultural applications. Disclosed herein is a combination device configured to provide both air pressure and electricity generation functions, reduce system load and improve efficiency through improved, consistent operation. These devices and systems are constructed and arranged to increase efficiency of an agricultural planter and lessen the load on a remote hydraulic system or other power source.

Certain of the disclosed implementations can be used in conjunction with any of the devices, systems or methods taught or otherwise disclosed in U.S. application Ser. No. 16/121,065, filed Sep. 1, 2018, and entitled "Planter Down Pressure and Uplift Devices, Systems, and Associated Methods," U.S. Pat. No. 10,743,460, filed Oct. 3, 2018, and entitled "Controlled Air Pulse Metering Apparatus for an Agricultural Planter and Related Systems and Methods," U.S. application Ser. No. 16/272,590, filed Feb. 11, 2019, and entitled "Seed Spacing Device for an Agricultural Planter and Related Systems and Methods," U.S. application Ser. No. 16/142,522, filed Sep. 26, 2018, and entitled "Planter Downforce and Uplift Monitoring and Control Feedback Devices, Systems and Associated Methods," U.S. application Ser. No. 16/280,572, filed Feb. 20, 2019 and entitled "Apparatus, Systems and Methods for Applying Fluid," U.S. application Ser. No. 16/371,815, filed Apr. 1, 2019, and entitled "Devices, Systems, and Methods for Seed Trench Protection," U.S. application Ser. No. 16/523,343, filed Jul. 26, 2019, and entitled "Closing Wheel Downforce Adjustment Devices, Systems, and Methods," U.S. application Ser. No. 16/670,692, filed Oct. 31, 2019, and entitled "Soil Sensing Control Devices, Systems, and Associated Methods," U.S. application Ser. No. 16/684, 877, filed Nov. 15, 2019, and entitled "On-The-Go Organic Matter Sensor and Associated Systems and Methods," U.S. application Ser. No. 16/752,989, filed Jan. 27, 2020, and entitled "Dual Seed Meter and Related Systems and Methods," U.S. application Ser. No. 16/891,812, filed Jun. 3, 2020, and entitled "Apparatus, Systems, and Methods for Row Cleaner Depth Adjustment On-The-Go," U.S. application Ser. No. 16/997,361, filed Aug. 19, 2020, and entitled "Apparatus, Systems, and Methods for Steerable Toolbars," U.S. application Ser. No. 16/997,040, filed Aug. 19, 2020, and entitled "Adjustable Seed Meter and Related Systems and Methods," and U.S. application Ser. No. 17/011,737, filed Sep. 3, 2020, and entitled "Planter Row Unit And Associated Systems and Methods," each of which is incorporated herein.

In modern farming, agricultural tractors and other planting vehicles require numerous systems and devices operating together for effective and efficient planting. Often the various systems and devices on an agricultural equipment or vehicle—including air pressure systems (positive and negative) and electrical systems—are ultimately powered by the tractor pulling the implement. In certain implementations, a remote hydraulic system, such as on a tractor, provides power to each of the systems, sub-systems, and devices on the implement.

In one example, hydraulic pressure generated by a remote hydraulic system may be used to turn a motor to spin a fan to create positive air pressure and/or negative air pressure (vacuum). In some implementations, positive air pressure is used to move seeds from a central seed hopper to individual seed meters. In further implementations, negative air pressure (vacuum) is used to separate the individual seeds from the seed meter supply and accurately place the seeds within the furrow. Various other applications of air pressure would be recognized by those of skill in the art.

Additionally, hydraulic pressure may be used to provide power for other functions on the implement including raising and lowering the various aspects, tools and implements, providing downforce, and actuating many other functions—such as row pass markers, liquid fertilizer application, and other functions as would be appreciated by those of skill in the art.

In one implementation, hydraulic pressure from a remote hydraulic system may also be used to turn a motor to spin a generator and/or alternator to produce electricity that is utilized by an electrical system on an implement, as would be understood. It would be readily appreciated that electricity may be used to power a motor that rotates a seed meter. Additionally, electricity may be used to power a variety of electronic components, such as control modules, as would be understood. Various additional forms of energy and/or systems may be used in connection with an agricultural vehicle or implement as would be understood by those of skill in the art.

As is apparent from the above description, the remote hydraulic system of the tractor may provide power to large variety of devices and systems on an agricultural vehicle or implement, and as a result, the demand on the remote hydraulic system can overtake its capacity. Such overloading of a remote hydraulic system may lead to malfunctions, inefficiencies, and other issues with the proper functioning of an agricultural vehicle or implement, such as a planter, as would be understood.

Further, the various devices and systems that are powered by the remote hydraulic system often have different requirements. For example, some of the systems or devices may require high flow and low pressure while other systems or devices may require low flow and high pressure. These varying demands often require the remote hydraulic system to operate at a high flow, high pressure condition which can lead to wasted flow and/or pressure which is then radiated to the atmosphere as heat. It will be appreciated that this heat is wasted energy that takes away from the overall horsepower of the tractor.

It would be readily appreciated by those of skill in the art that various alternative power sources may be used instead of or in conjunction with the remote hydraulic system. For example, the tractor may provide power to the system via a PTO drive, belt drive, chain drive, and/or other power source as would be recognized by those of skill in the art. Use of alternative power sources may eliminate or reduce the negative side effects of overloading a remote hydraulic system, but may in turn cause additional issues, such as increased costs, number of parts, and complexity of the machinery.

Figure 2:
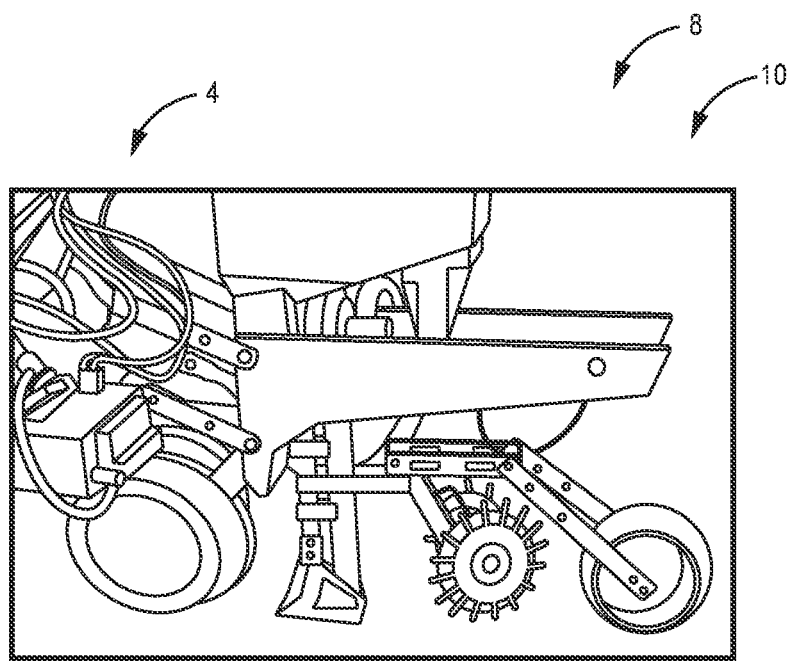
FIG. 2 is one implementation of a row unit for use with the system, according to one implementation.

Turning to the figures in greater detail, FIG. 1 shows an exemplary planter 6. As would be understood, typical agricultural planters 6 typically include a plurality of row units 8 used for planting row crops. Typically, each row unit 8 on the planter 6 is substantially identical, although certain variation may exist, as would be understood. An exemplary row unit 8 is shown in FIG. 2. It is readily appreciated that the row units 8 contemplated herein can be adapted for high-speed planting and comprise a variety of components configured to facilitate the planting of row crops.

Further, planters 6 may be attached to a tractor (not pictured) via a hitch or any other recognized connection mechanism readily understood in the art. As previously taught, for example, the tractor may include a hydraulic system 4 in operative communication with the planter 6 such that the hydraulic system 4 on the tractor provides hydraulic fluid(s) to the planter 6, in a manner that would be recognized by those of skill in the art. Further implementations utilize alternate downforce systems understood in the art.

Turning to FIGS. 3-6, in the various implementations, an efficient fan and generator system 10 is provided to reduce total demand on the remote hydraulic system 4 or other common power source. In various implementations of the system 10, the demand is reduced by combining the functions of generating air pressure (positive and/or negative) and electricity into a single device. In some implementations, a single hydraulic motor is operated at or near maximum system pressure thereby minimizing wasted heat energy to improve total system efficiency.

In certain implementations, the system 10 allows several low-cost generators to be distributed across a machine, equipment, vehicle, or implement for integration with a distributed system. In these implementations, the system 10 may allow for cost savings not be achievable using more conventional methods.

In prior art implementations, an implement would typically include one central generator with capacity to supply the electrical needs of the entire implement. The disclosed system 10 removes the need for a central generator and replaces it with two generators that only need the capacity to power, for example, twelve planter 6 row units 8. That is, in certain implementations, the generator is located central to the powered row units 8 so power distribution would only need to be done over half of the machine width. Accordingly, for example, the farthest row unit 8 is only six row spacings from the generator unit, thereby allowing for lighter gauge cabling and potentially reduced overall system cost, as would be readily understood by those of skill in the art.

Further, in this example, the total tractor hydraulic output demand may be reduced from a factor of about three to a factor of about two, thereby making the system 10 according to these implementations more efficient. That is, the system 10 is configured to supply air pressure and electrical power to the planter 6 at the same level as the prior art while reducing demand at the remote hydraulic system 4 by combing the functions of air pressure generation and power generation, as described herein.

Turning back to the figures, FIGS. 3-6 depict various view of the system 10. In various implementations, a hydraulic motor 12 and a generator 24 are mounted, or otherwise disposed on or within a housing 11 comprising one or more of a fan housing 14 and/or generator housing 38 that define openings 15, 39 where various components can be affixed and air can flow, as described herein and readily appreciated. In these implementations, the fan housing 14 also contains an air pressure fan assembly 16.

Figure 3:
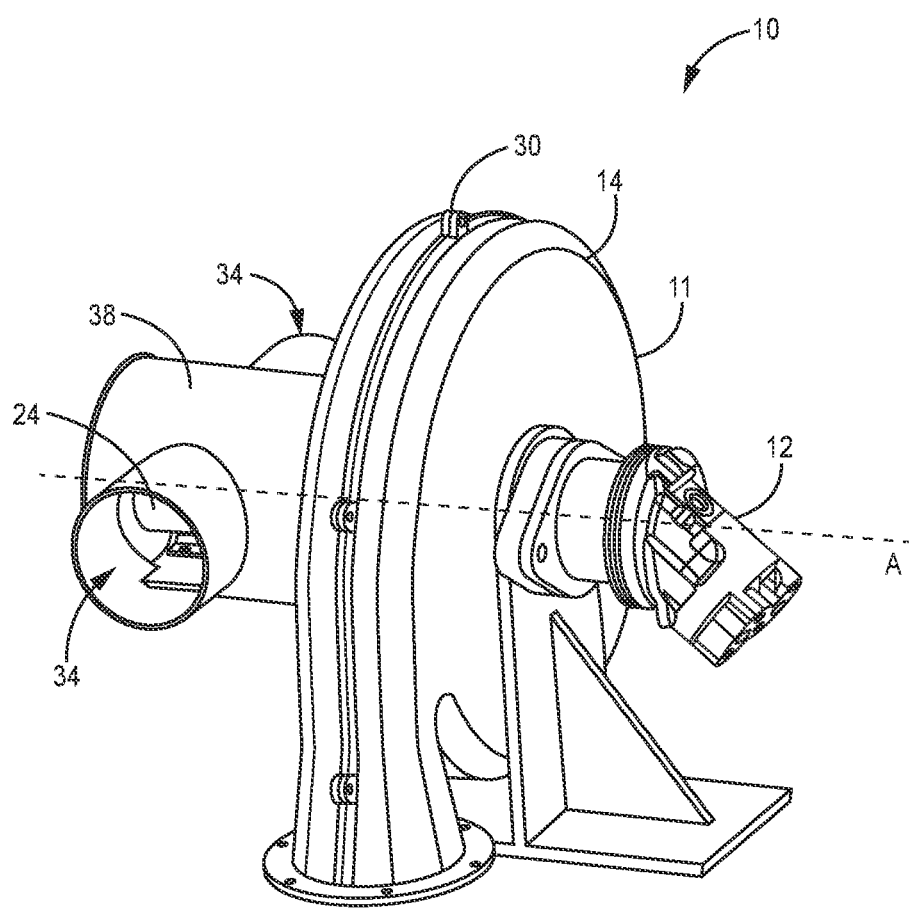
FIG. 3 is a perspective view of the system, according to one implementation.
Figure 4:
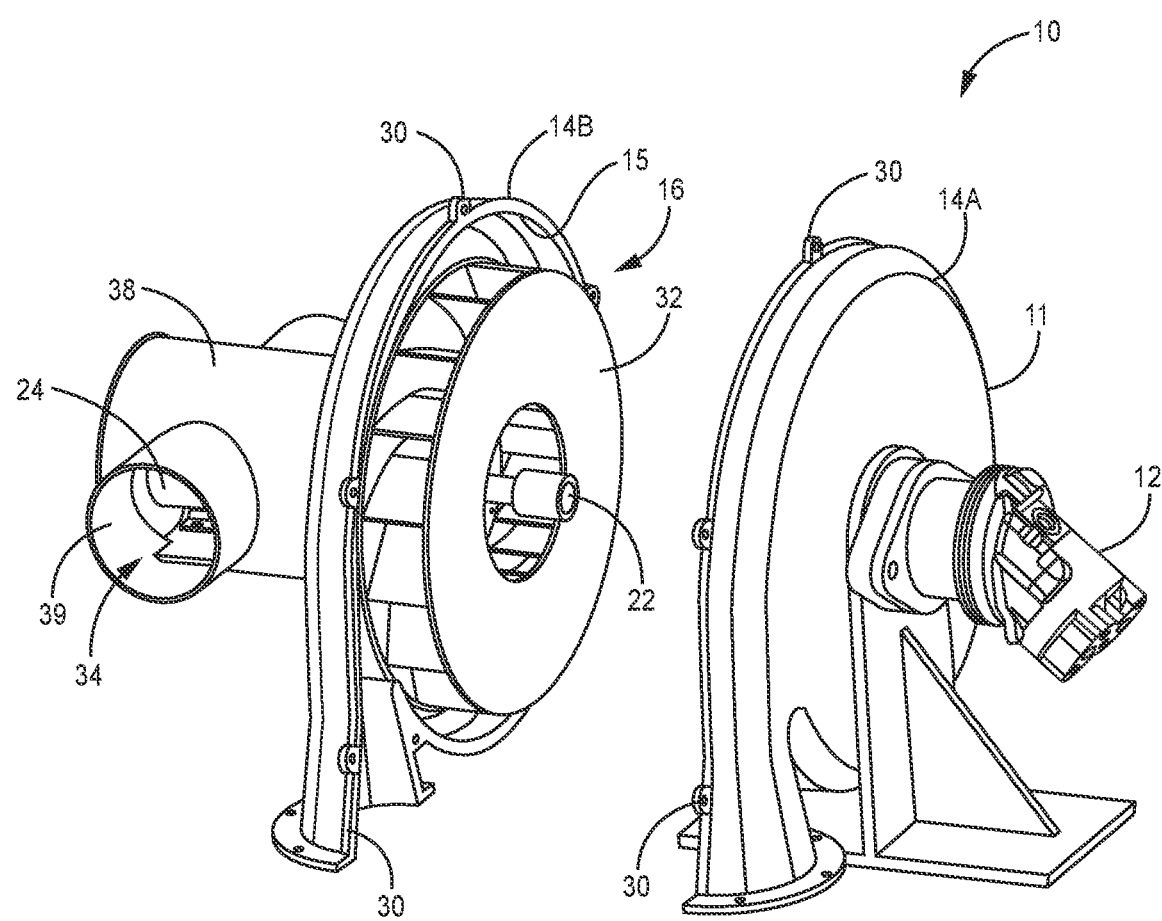
FIG. 4 is a cross-sectional view of the system, according to one implementation.

As shown in FIGS. 3 and 4, the fan housing 14 may have two sides 14A, 14B connected by a plurality of bolts or other fasteners (not shown) inserted through one or more flanges 30, as would be readily appreciated. Any other attachment mechanism may be used as would be appreciated by those of skill in the art. The fan housing 14 may be disassembled by removing the bolts or other fasteners and separating the two sides 14A, 14B of the fan housing 14 along the flange 30. In various of these implementations, the fan blade 32 remains connected to an optional connecting shaft 20 and the hydraulic motor 12 slides out of connection with an optional shaft coupler 22, when in a disassembled configuration.

In various implementations, a motor 12 is disposed on one side of the fan housing 14 via any attachment mechanism known to those of skill in the art. In certain implementations, the motor 12 is a hydraulic motor 12, though other motors such as electric motors are of course contemplated. The hydraulic motor 12 displacement may be sized to operate at or near maximum operating pressure of the remote hydraulic system in order to increase system 10 efficiency.

In various implementations, the total displacement of the system 10 is smaller than the total displacement in a prior system have separate hydraulic motors for discrete components, such as one hydraulic motor each for a fan and electrical generator. It would be appreciated that the displacement for individual motors in a system having multiple discrete motors may be smaller than the displacement value for a single motor system. The reduced total displacement for the single motor system 10 thereby reduces the load on the remote hydraulic system and increases overall efficiency.

Figure 5:
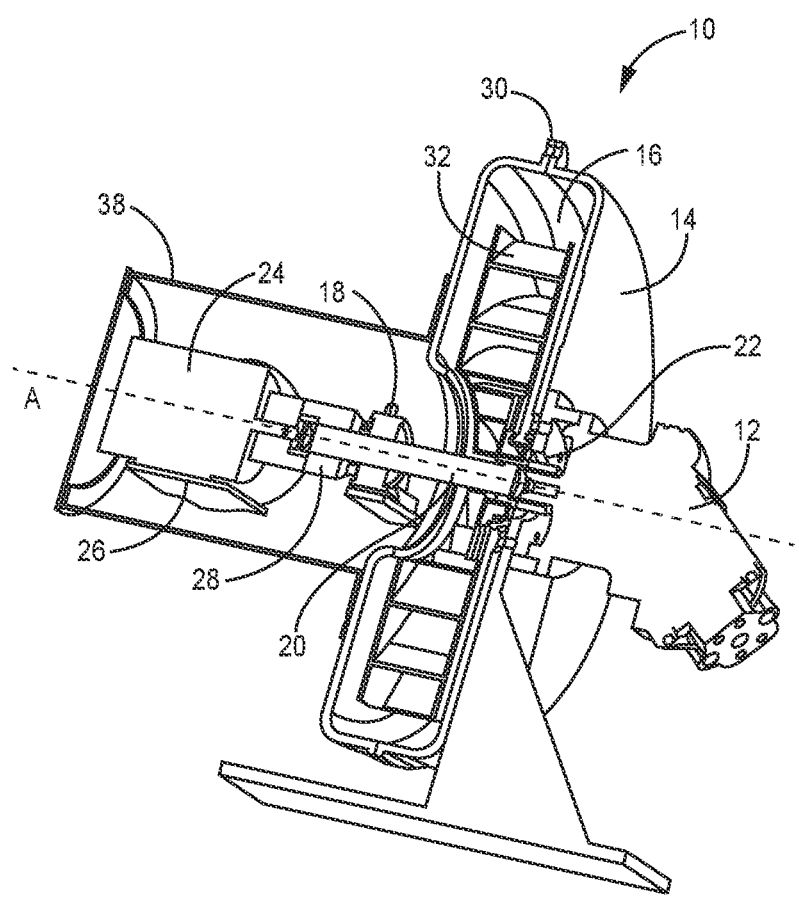
FIG. 5 is a cross-section view of the system with negative air pressure fan assembly, according to one implementation.
Figure 6:
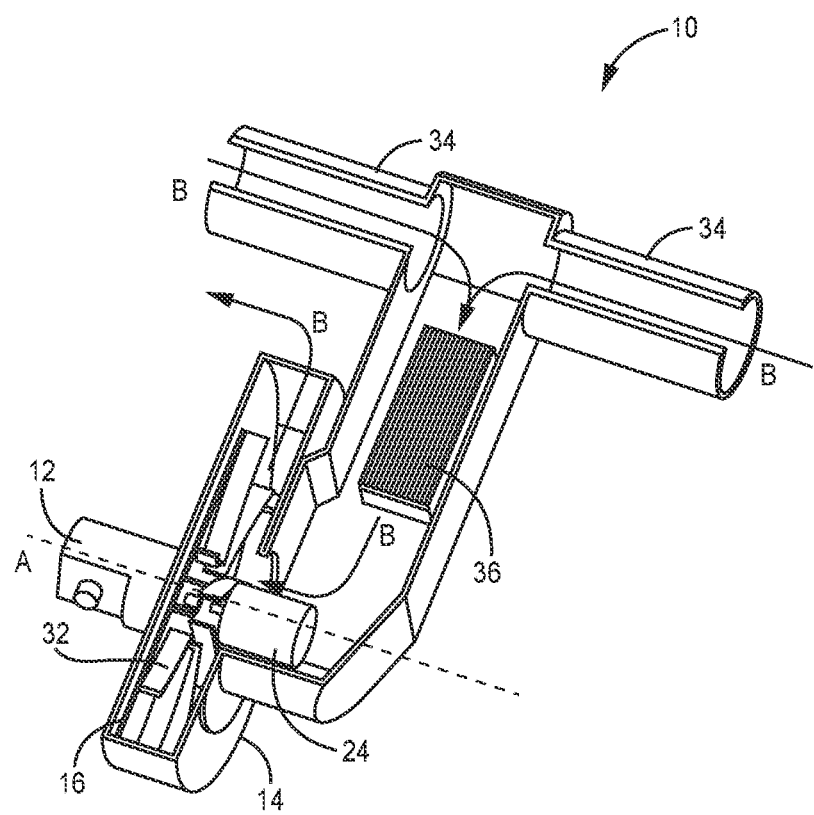
FIG. 6 is a perspective view of the disassembled system, according to one implementation.

As shown in FIGS. 4-6, the fan assembly 16 includes fan blades 32. In various implementations, the fan blades 32 rotate about an axis, such as common axis A. In various implementations, the fan assembly 16 generates positive and/or negative air pressure for operations such as distributing seed to individual row meters and/or singulating seed in a seed meter in combination with a rotating seed disc. It is appreciated that the amount of air pressure required for these operations may vary with seed type, machine size, travel speed, and other factors as would be recognized.

In some implementations, the fan 32 speed is adjustable and may be adjusted automatically or manually by an operator as needed within the operable range. In various implementations, the speed adjustment may be variable and be implemented on-the-go in conjunction with other overall automated system control processes such as those described in the incorporated references.

As shown in FIG. 5, in some implementations, a generator 24 or alternator 24 is contained within a generator housing 38. In various implementations, the generator 24 or alternator 24 is supported by an optional support plate 26 within the generator housing 38.

In certain implementations the system 10 may provide for integral cooling of various electronic components—for example the generator, alternator, voltage control module, and the like—by using air pressure generated by the fan. This integral cooling aspect contributes to maximizing the efficiency of the system 10 and generation of electricity.

Shown for example in FIG. 6, the generator housing 38 may include ducts 34 for drawing in and/or blowing out air. For example, air may be drawn across the generator 24, such as in a negative air flow (vacuum) system, shown at reference arrows B. As would be readily apparent to those of skill in the art, in certain alternate implementations, air is blown across the generator 24 in a positive air flow system.

The generator 24 or alternator 24 may produce a voltage higher and/or lower than the system 10 requires. In these and other implementations, a voltage regulator 36 or voltage control module 36 may be provided to monitor the input voltage and/or supply constant voltage to the system 10 and/or vehicle, as will be discussed further below. In various implementations, the voltage control module 36 operates such that if the fan assembly 16 speed is adjusted the input voltage may fluctuate accordingly but the output voltage will remain constant. It is appreciated that in various implementations, the various modules described herein, including but not limited to the voltage control module 36, may be electronically integrated with or in communication with a control system disposed elsewhere on the implement, such as any of the control systems described in the references incorporated above.

In these and other implementations, various support components may be utilized by the system 10. In certain implementations, such as that shown in FIG. 5, the system 10 may include an optional support bearing 18 mounted to the fan housing 14 opposite the motor 12. In these and other implementations, the support bearing 18 engaged with the optional connecting shaft 20 as the connecting shaft 20 projects from the hydraulic motor shaft coupler 22 through fan assembly 16. In further implementations, the connecting shaft 20 is then coupled to the generator 24 by an optional generator coupler 28.

In some implementations, the generator 24, fan assembly 16 and hydraulic motor 12 are in operational communication via a central or common axis (show at A). In certain implementations, a connecting shaft 20 defines the central axis A and includes a hydraulic motor shaft coupler 22. The hydraulic motor shaft coupler 22 is engaged with the hydraulic motor 12 such that as the hydraulic motor 12 turns so does the connecting shaft 20.

FIG. 6 shows an exemplary implementation of the system 10 wherein the fan assembly 16 generates negative air pressure (vacuum). The hydraulic motor 24, fan assembly 16, and generator 24 are connected along a common axis A. Air may be drawn into the assembly through ducts 34, following reference arrows B. In various implementations, the ducts 34 are connected to the individual vacuum seed meters (not shown). According to these implementations, as the air flows through the system 10 it passes over a voltage control module 36 or voltage control regulator and the generator 24 such that heat is dissipated from the voltage control module 36 and generator 24.

In various implementations of the system 10, the voltage produced by the generator 24 is dependent on the rotational speed of generator 24, and the electrical load placed on the generator 24. As the speed and electrical load vary the output of the generator 24 may vary above and below the voltage required by the system 10. In various of the implementations described herein the speed of the generator 24 may depend upon and vary as the speed of the fan assembly 24 is adjusted. As described above, in various implementations, a voltage control module 36 may be utilized to condition the output of the generator 24 into the voltage or voltages required by the system 10, equipment and/or vehicle, as would be appreciated.

The generator 24 or alternator may produce either direct or alternating current(s). It will be appreciated that the type of generator 24 or alternator 24 implemented may impact the quality of the power required by the vehicle and/or agricultural equipment and the type of voltage regulator 36 to be used.

In various implementations the system 10 includes a fan and generator system that are powered from a common source, such as the remote hydraulic system described above. The fan and generator system may additionally include a voltage regulation device and/or system to allow for stable generation of electricity despite operating the fan at various speeds.

Various devices, systems, and methods may be used by the system 10 to regulate the electrical output of the generator 24. For example, active or passive rectification, switch mode power supplies (buck, boost, buck/boost), pulse width modulation, generator field coil strength modulation, AC transformers, voltage and current filters such as capacitors, inductors and/or resistor networks may be utilized, as well as alternate electrical regulation systems known in the art.

FIGS. 7-10 depict various implementations of electrical flow within the system 10 from the alternator 24 or generator 24.

Figure 7:
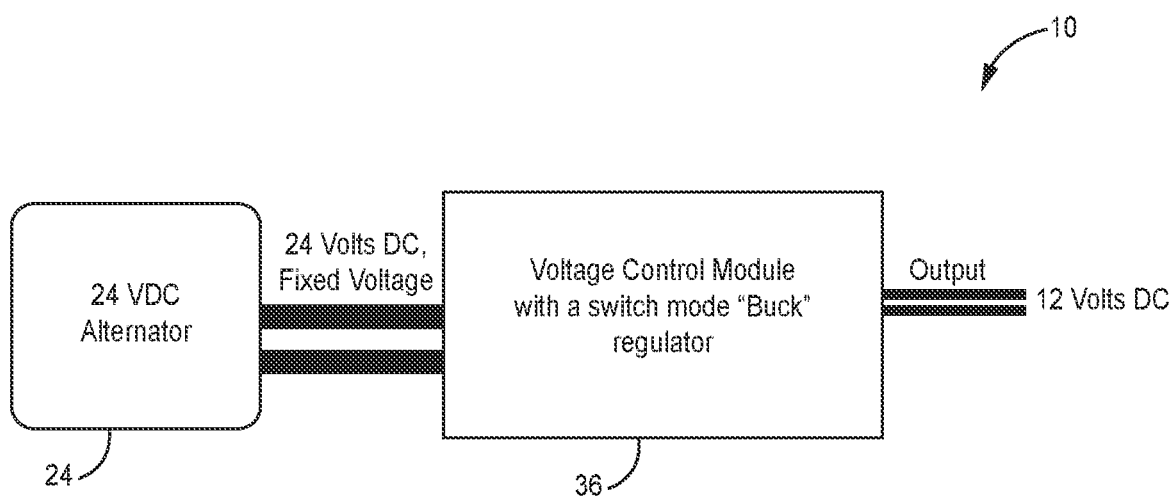
FIG. 7 is a flow chart depicting electrical flow within the system, according to one implementation.

FIG. 7 shows one exemplary implementation of an alternator 24 in use with a voltage control module 36. In these and other implementations, a 24 Volt DC (VDC) fixed voltage alternator 24 is in communication with a voltage control module 36, such that the output of the alternator 24 is conditioned by the voltage control module 36. In certain implementations, the voltage control module 36 conditions the output of the alternator 24 by a switch mode "buck" regulator to provide 12 volts DC to the vehicle or agricultural equipment.

Figure 8:
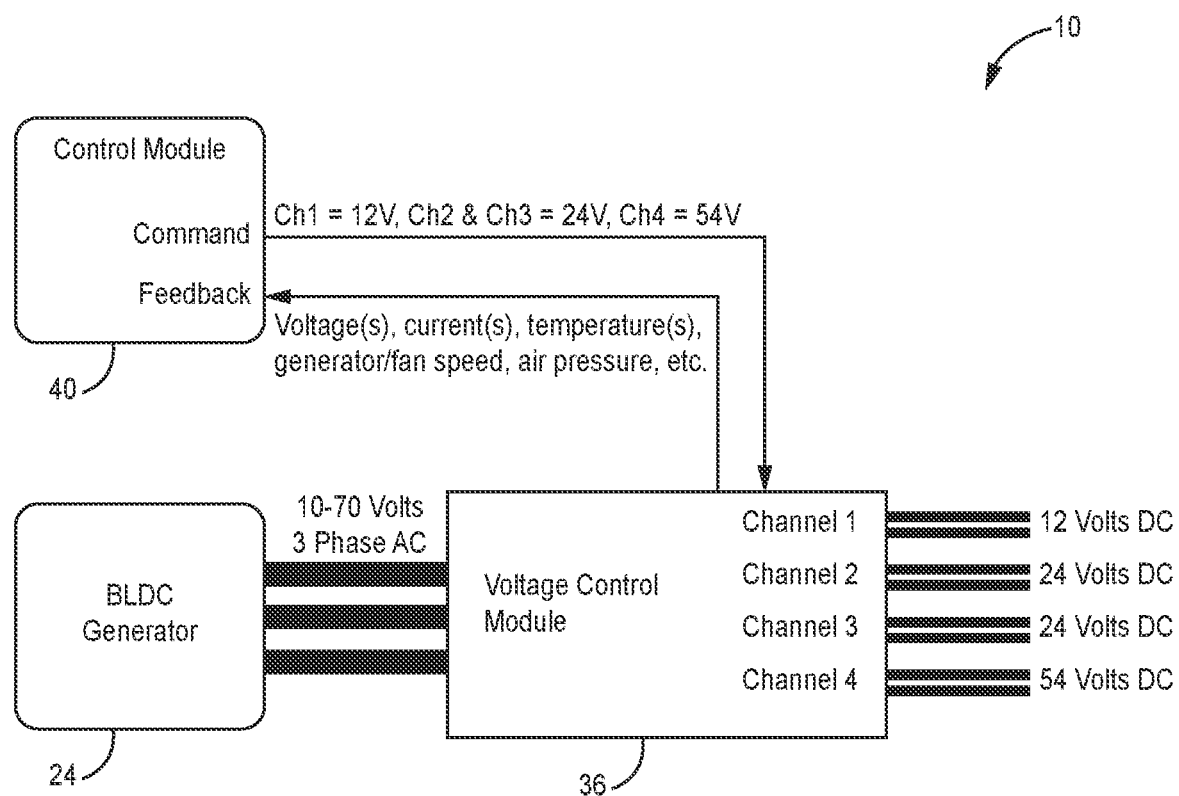
FIG. 8 is a flow chart depicting electrical flow within the system, according to one implementation.

FIG. 8 shows another exemplary implementation of electrical flow within the system 10. The generator 24 may fluctuate output between 10 and 70 volts. The fluctuations in generator 24 output may be due to variations in fan speed. Fan speed may be adjusted to meet the variable air flow requirements of the vehicle or agricultural equipment. The voltage control module 36 is in communication with the generator 24 and may rectify the 3 phase AC generator power into DC. In various implementations, a control module 40 is in communication with the voltage control module 36 and commands the output(s) of the voltage control module 36.

In these and other implementations, the voltage output by the voltage control module 36 may be controlled/varied based on inputs from the control module 40 (also referred to as a "controller 40"). For example, the control module 40 may command the voltage control module 36 to output four channels to target a specific voltage. The DC power may then be directed to four buck/boost switch mode regulators that programmatically adjust the voltage of each channel to the desired setpoint. In various of these implementations, the voltage control module 36 has sensors and/or other mechanisms to provide feedback to the control module 40, which in turn can be in operable communication with the other implement control systems.

Figure 9:
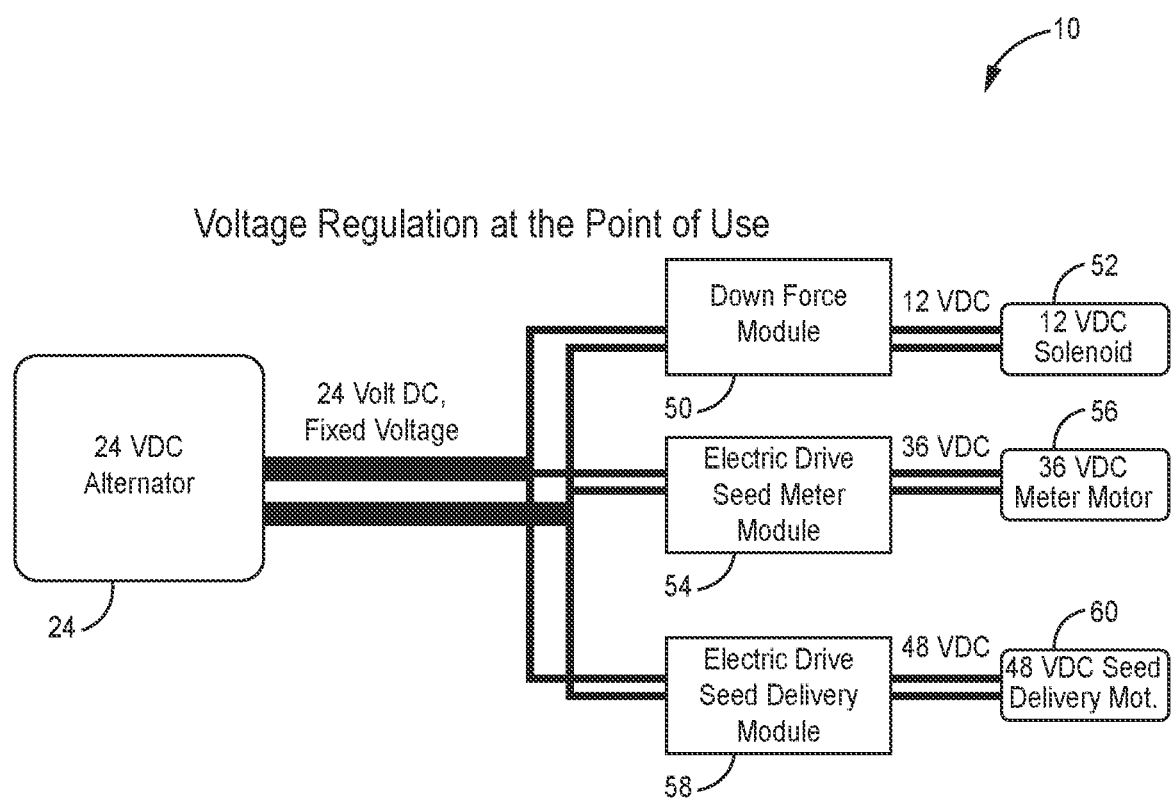
FIG. 9 is a flow chart depicting electrical flow within the system, according to one implementation.
Figure 10:
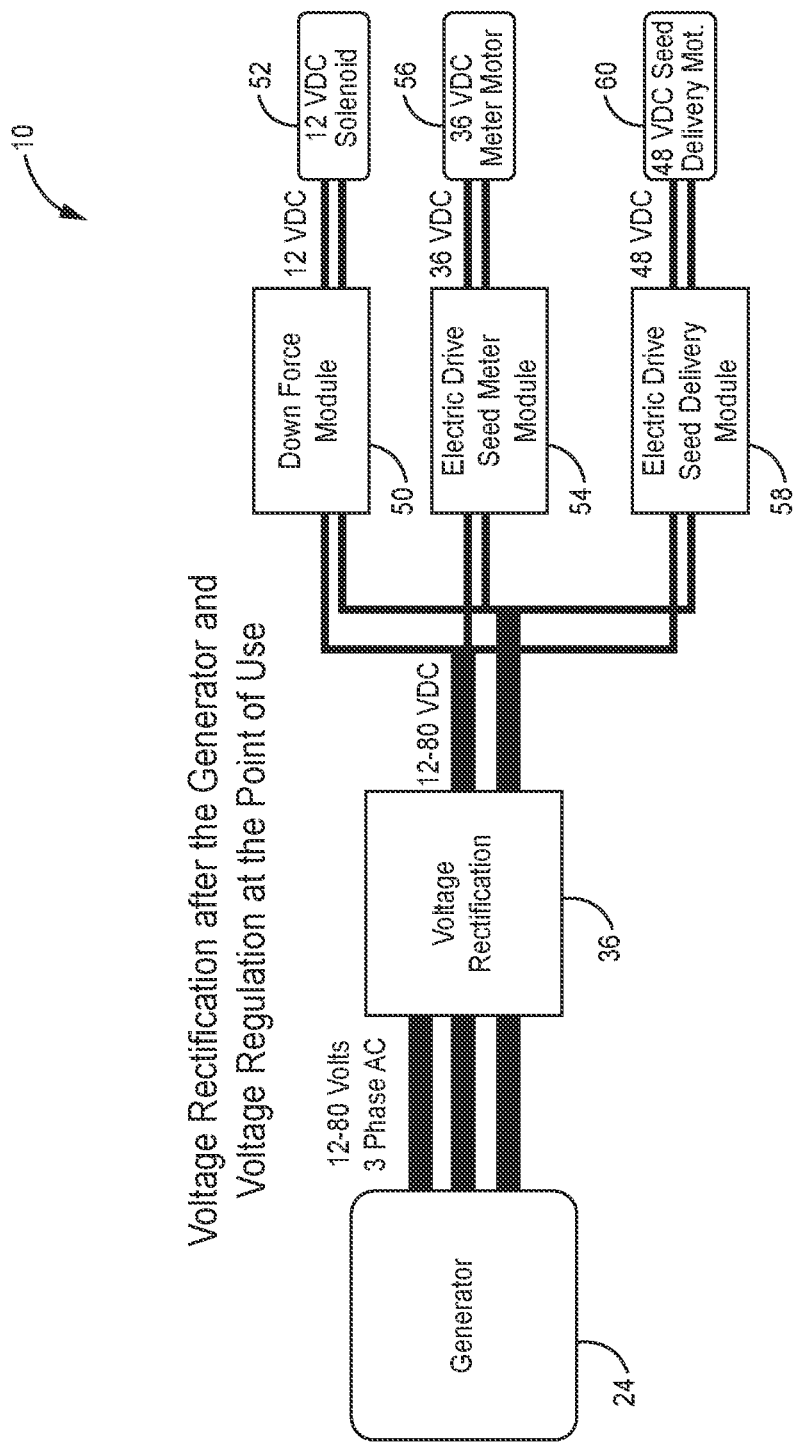
FIG. 10 is a flow chart depicting electrical flow within the system, according to one implementation.

In another implementation, shown in FIG. 9, the system 10 includes an alternator 24 but does not include a voltage control module 36. In these and other implementations, voltage regulation occurs at the point of use on the implement. In one specific example, a down force module 50 may use pulse width modulation (PWM) of the 24 VDC from the alternator 24 to actuate a 12 VDC solenoid 52. An electric drive seed meter module 54 and electric drive seed delivery module 58 may use a boost regulator to produce the required 36d 48 VDC for the seed meter motor 56 and seed delivery motor 60, respectively.

In another implementation, the system 10 may use a three phase AC generator 24 in communication with a voltage rectification module 36. The generator 24 may produce voltage varying from about 12 to about 80 volts. The voltage rectification module 36 may be used to convert the unregulated AC voltage into unregulated DC voltage. The various modules 50, 54, 58 on the implement may take the unregulated DC voltage and regulate it as required to power the respective devices—such as a solenoid, seed meter motor, and seed delivery motor.

Although the disclosure has been described with references to various embodiments, persons skilled in the art will recognized that changes may be made in form and detail without departing from the spirit and scope of this disclosure.

What is claimed is:

1. A system comprising:
(a) a fan housing comprising a first side and a second side;
(b) an adjustable speed fan assembly disposed within the fan housing;
(c) a generator connected to the first side of the fan housing;
(d) a hydraulic motor connected to the second side of the fan housing; and
(e) a voltage regulator in operative communication with the generator, the voltage regulator constructed and arranged to generate consistent output voltage in excess of a required output voltage from variable input voltage from the generator,
wherein:
air passes over the generator and voltage regulator from the fan assembly to provide integral cooling,
the adjustable speed fan assembly and the generator are driven by a common shaft from the hydraulic motor, such that the generator produces variable input voltage correlating to a speed of the adjustable speed fan assembly, and
the generator is a brushless DC motor.

2. The system of claim 1, wherein the generator provides multi-level voltage output.

3. The system of claim 1, where in the fan assembly is an adjustable speed fan.

4. The system of claim 1, further comprising a controller constructed and arranged to modulate speed of the hydraulic motor, speed of the fan assembly, or generator output.

5. The system of claim 1, further comprising one or more air ducts in fluidic communication with the fan assembly.

6. The system of claim 5, wherein the one or more air ducts are in communication with one or more seed meters.

7. The system of claim 1, wherein the output of the voltage regulator powers one or more of a solenoid, a seed meter motor, and a seed delivery motor.

8. An air pressure and electrical generator comprising:
(a) a hydraulic motor comprising hydraulic motor shaft;
(b) a fan assembly in operative communication with the hydraulic motor shaft;
(c) brushless DC motor in operative communication with the hydraulic motor shaft; and
(d) a voltage regulator in operative communication with the brushless DC motor,
wherein:
actuations of the hydraulic motor shaft cause actuation of both the fan assembly and the brushless DC motor and a speed of the fan assembly is adjustable,
wherein the brushless DC motor produces variable input voltage over the speed range of the fan assembly, and
wherein the voltage regulator is constructed and arranged to generate consistent output voltage from the variable input voltage.

9. The generator of claim 8, further comprising a connecting shaft extending from the hydraulic motor to the fan assembly and the brushless DC motor, wherein the connecting shaft is configured to rotate the fan assembly and the brushless DC motor.

10. The generator of claim 8, wherein the fan assembly is configured to generate positive air pressure in one or more air ducts.

11. The generator of claim 8, wherein the fan assembly is configured to generate negative air pressure in one or more air ducts.

12. The generator of claim 8, wherein the speed of the fan assembly is adjustable by varying the hydraulic motor speed.

13. The generator of claim 8, further comprising a controller constructed and arranged to command output voltage of the voltage regulator.

14. The generator of claim 8, wherein the output of the voltage regulator powers one or more of a solenoid, a seed meter motor, and a seed delivery motor.

15. An agricultural planter system comprising:
(a) a plurality of row units;
(b) a remote hydraulic system;
(c) one or more air pressure and electrical generators comprising:
(i) a motor, in fluidic communication with the remote hydraulic system;
(ii) a fan in operative communication with the motor, wherein the fan is constructed and arranged to generate positive or negative air pressure and wherein a speed of the fan is adjustable to generate varying air pressures;
(iii) a generator in operative communication with the motor and the fan, the generator constructed and arranged to generate variable input voltage,
wherein the motor, fan, and generator rotate about a common axis, and
(iv) a voltage regulator in operative communication with the electrical generator;
(d) one or more seed meters in operative communication with the air pressure and electrical generators,
wherein the voltage regulator is constructed and arranged to generate consistent output voltage from variable input voltage from the generator, and
wherein airflow into the fan is drawn across the generator and the voltage regulator to dissipate heat.

16. The system of claim 15, wherein the voltage regulator is constructed and arranged to output power via at least two output channels each output channel requiring a different voltage.

17. The system of claim 15, further comprising a controller in operative communication with the voltage regulator, wherein the controller is constructed and arranged to command output of the voltage regulator.

18. The system of claim 17, wherein the output of the voltage regulator powers one or more of a solenoid, a seed meter motor, and a seed delivery motor.

19. The system of claim 15, wherein the generator is a brushless DC motor.

\* \* \* \* \*